UNITED STATES PATENT OFFICE.

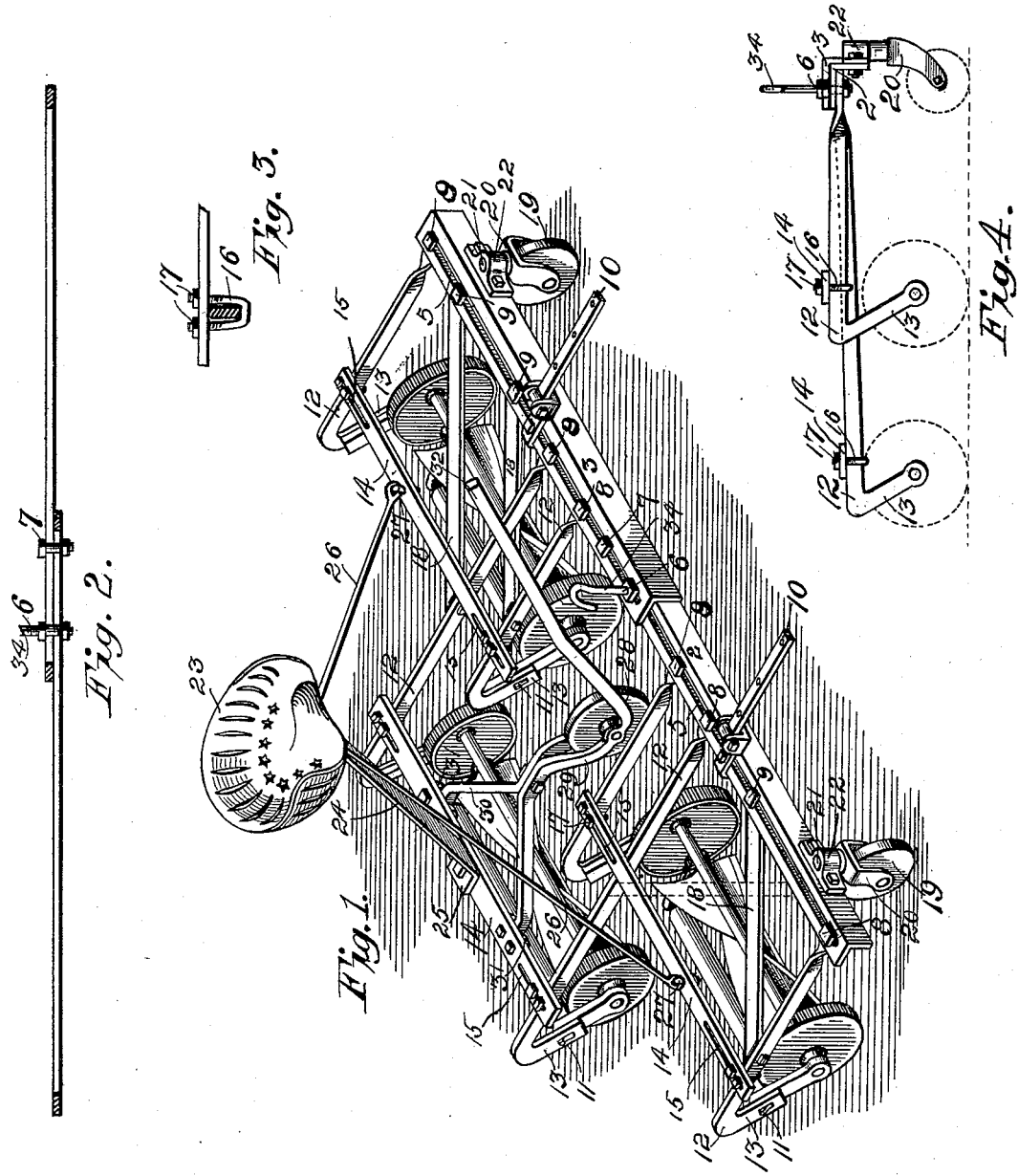

GEORGE W. DAKE AND EDWARD U. LOOSE, OF MINNEAPOLIS, MINNESOTA; SAID DAKE ASSIGNOR TO SAID LOOSE; SAID LOOSE ASSIGNOR OF ONE-HALF TO ANDREW B. ROBBINS, OF SAME PLACE.

GANG LAWN-MOWER.

SPECIFICATION forming part of Letters Patent No. 488,669, dated December 27, 1892.

Application filed October 15, 1891. Renewed November 17, 1892. Serial No. 452,263. (No model.)

*To all whom it may concern:*

Be it known that we, GEORGE W. DAKE and EDWARD U. LOOSE, of Minneapolis, in the county of Hennepin and State of Minnesota, have invented certain Improvements in Gang Lawn-Mowers, of which the following is a specification.

Our invention relates to horse power lawn mowers and the object of the same is to provide a light, compact, cheap, durable and thoroughly efficient lawn mower adapted to perform far more work to a given power and time expended than any of the horse power mowers heretofore devised.

To this end our invention consists in the combination of two or more small, light lawn mowing machines or sections with means for securing the same in proper positions to make a single clean swath; in special means for attaching said smaller machines whereby each is allowed independent vertical movement; in a novel draft beam combined therewith; and in other details of construction and combinations all as hereinafter described and particularly pointed out in the claims.

Our invention will be more readily understood by reference to the accompanying drawings, in which, Figure 1 is a general perspective of a gang mowing machine embodying our invention. Figs. 2, 3 and 4 are details taken from Fig. 1 showing the construction of the draft beam and manner of attaching tie bars to the draft rods.

In the general construction of our mower we employ three of the small ordinary hand lawn mowers as sections of one large wide machine which owing to the lightness of the parts is easily drawn by a single horse. In this way we break the long roller and wiper of the ordinary wide horse-mower into several light running sections, each self operating, and do away with the very heavy roller used to drive the long wipers of the ordinary machine. These sections are independently attached to a main cross or draft bar and one of the main advantages of our machine is that owing to the lightness of the revolving wipers they stop when clogged by a stick or stone instead of being broken because of their momentum as is the case with the heavy wipers of the large machines which are necessarily so heavy that they cannot be stopped suddenly without damage. Further the sections, being independently attached to a main draft or cross beam or bar, rise or fall independently so that the whole mower conforms readily to the unevenness of the ground thus leaving a clean smooth lawn.

In place of employing the heavy driving roll necessary to operate the large heavy wiper of an ordinary horse mower we use the light power wheels having the serrated peripheries and as a consequence of this lightening of the machine it can be drawn by a much lighter horse thus lessening the damage to the lawn from the horse's hoofs. The machine being light is subject to no heavy jars which would result in breakage and wear and make necessary constant repairs.

In the drawings, 2 and 3 represent the slotted angle bars making up the extension draft bar or beam of the machine. Each of these angle bars is provided with the long slot 5 and the bolts 6 and 7 extend through the same to lock the two bars firmly together. The slots 5 as shown extend nearly the full length of each bar and accommodate the bolts 8 and 9 which secure the ends of the draw bars and the braces of the small machines. By loosening the bolts 6 and 7 it will be seen that the main beam may be adjusted to accommodate any desired number or sizes of hand mowers or one section may be used alone for two mowers. The thill couplings 10 are adjustably secured to the draft bar by bolts arranged in the slots thereof.

On every mower will be found small lugs 11 which are ordinarily employed for fastening the mower handle.

The draft rods 12 extend back from the beam and are provided with the depending end 13 provided with slots to admit these lugs and the rear ends of each pair of draft rods are drawn and locked firmly in place thereon by the tie bars 14. These bars are provided with the slots 15 to allow an adjustment of the draft rods to admit any width of hand mowers. The bars and draft-rods are looked by the U-bolts or clips 16 fastened by the nuts 17. The draft rods of the end mowers are of the same length while the middle and rear mower is secured to the draft beam by rods about twice as long, which pass between the other draft rods and beneath the tie bars 14 of the front mowers. The front draft bars are raised higher from the ground than the rear ends of the middle ones so that enough space is left beneath the front tie bars 14 and the middle section bars 12 to admit considerable vertical movement of the rear mower without the draft rods thereof striking said tie bars or vice versa.

Each small mower is braced laterally by one or more bars or rods 18 extending from the draft beam as shown to one of the draft bars, thereby preventing any twisting of the frame. The draft beam is supported by the small truck wheels 19 secured at the ends thereof in the yokes 20 having perpendicular studs 21 fixed in the bearing blocks 22 secured on the beam.

A driver's seat 23 may be arranged above the machine, the same being supported by the back spring 24 having its lower end 25 secured on the rear tie bar 14 and by the front brace rods 26 extending to the eyes 27 provided on the tie bars belonging to the front sections of the machine.

In crossing streets or gravel walks considerable damage would be done to the knives if allowed to come in contact with the bare ground, we therefore provide the center truck wheel 28 secured in the yoke 29 having the bracing legs 30 extending back to pivotal connections 31 on the rear tie bar which tie bar as may be seen is preferably heavier than the others. From the truck wheel the lever 32 extends forward and by placing his foot on this lever the driver may force the same down and secure it beneath the hook 34 provided on the cross beam, by which operation the rear mower is lifted off the ground thereby raising or tilting forward the middle draft bars which engage the tie bars 14 of the front sections and lift these sections from the ground. It is obvious that the gang mower that we thus provide is of such light construction that a large number of small hand mowers or sections may be operated at once, the several mowers being secured in such lateral positions with respect to adjoining mowers that in operation the ends of the wipers thereof will overlap slightly and a clean perfect swath be cut of the full width of the gang mower.

Our machine being very light for its width as compared with other horse power machines we greatly increase the width of the machine and hence of course the work which the machine is capable of performing. Further owing to the simple and light construction of our machine it may be manufactured at an extremely cost as low compared with the horse power mowers heretofore devised.

Having thus described our invention we claim as new and desire to secure by Letters Patent:—

1. The combination in a gang lawn mower, of two or more light mowing sections, with an extension draft beam, draft rods extending on each side of said sections and having their forward ends secured on said beam, and tie bars for said draft rods or bars, substantially as described.

2. The combination in a gang lawn mower, of two or more small mowing machines, with a draft beam, rearwardly extending draft rods having depending ends engaging said mowers, said mowers being thereby independently secured to said beam, tie bars for the rear ends of said rods, and means for raising said mowers from contact with the ground, substantially as described.

3. The combination in a gang lawn mower, of two or more light hand mowers, with an extension draft beam, the parts thereof composed of slotted angle bars, bolts for securing the same rigidly together, draft rods secured thereto by bolts extending through the slots thereof, said rods having depending ends engaging said small mowers, said mowers arranged to overlap with respect to the cut, and tie and brace bars or rods for said draft rods, substantially as described.

4. The combination in a gang lawn mower, of two or more small light lawn mowers, with a frame whereto the same are independently secured, braces for preventing lateral movement of one with respect to the other, truck rollers or wheels for supporting said frame, and a driver's seat arranged thereon, substantially as described.

5. The combination in a gang lawn mower, of a draft bar or beam, with two or more independent mowing sections, draft rods extending from each side of said sections and having their ends secured on said draft bar, and tie bars extending transversely between the pairs of draft rods, and the connections between said tie bars and their draft rods, and between the draft rods and beam or bar being laterally adjustable, substantially as described.

6. The combination with a draft beam, of two or more pairs of draft rods having their forward ends secured thereon, independent mowing sections arranged between the rear ends of said rods, each mowing section being self operating, tie bars extending between the rear ends of said pairs of draft rods, and, overlapping with respect to the draft rods of adjoining section or sections, a lever having its rear end arranged to engage the rear part of one of the sections to lift the same and acting through the overlapping tie bars to simultaneously lift the other independently movable sections thereof, a fulcrum roller arranged on said lever, and means for securing the forward end of the lever when the same is forced down to raise said mowing sections from the ground, substantially as described.

7. The combination in a gang lawn mower of a draft beam, independently secured and vertically movable frames secured thereon, independent mowing sections arranged in the several frames and opposite to said draft beam, means for raising the free end of one or more of said frames and the mowing section or sections thereof, and said frame or frames having parts to engage the adjoining frames whereby the latter are also lifted.

In testimony whereof we have hereunto set our hands this 9th day of October, 1891.

GEORGE W. DAKE.
EDWARD U. LOOSE.

In presence of—
C. G. HAWLEY,
F. S. LYON.